United States Patent
Mikhemar et al.

(10) Patent No.: US 9,712,258 B2
(45) Date of Patent: *Jul. 18, 2017

(54) LOW-LOSS ELECTRICAL BALANCE DUPLEXER WITH NOISE CANCELLATION

(71) Applicant: BROADCOM CORPORATION, Irvine, CA (US)

(72) Inventors: Mohyee Mikhemar, Aliso Viejo, CA (US); Hooman Darabi, Laguna Niguel, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 207 days.

This patent is subject to a terminal disclaimer.

(21) Appl. No.: 14/631,714

(22) Filed: Feb. 25, 2015

(65) Prior Publication Data

US 2015/0171975 A1    Jun. 18, 2015

Related U.S. Application Data

(63) Continuation of application No. 13/719,055, filed on Dec. 18, 2012, now Pat. No. 9,000,860.

(51) Int. Cl.
| | |
|---|---|
| *H04B 15/00* | (2006.01) |
| *H04B 1/48* | (2006.01) |
| *H04B 1/525* | (2015.01) |
| *H04B 1/12* | (2006.01) |
| *H04L 5/14* | (2006.01) |

(52) U.S. Cl.
CPC ............ *H04B 15/00* (2013.01); *H04B 1/123* (2013.01); *H04B 1/48* (2013.01); *H04B 1/525* (2013.01); *H04L 5/14* (2013.01)

(58) Field of Classification Search
CPC ........................................................ H04B 15/00
See application file for complete search history.

(56) References Cited

U.S. PATENT DOCUMENTS

| | | | | |
|---|---|---|---|---|
| 7,515,879 | B2 * | 4/2009 | Okabe | H04B 1/38 370/276 |
| 7,801,493 | B2 * | 9/2010 | Do | H04B 1/44 343/700 R |
| 8,208,865 | B2 | 6/2012 | Mikhemar et al. | |
| 8,208,866 | B2 | 6/2012 | Mikhemar et al. | |
| 8,411,601 | B2 | 4/2013 | Smiley | |
| 8,792,836 | B2 | 7/2014 | Mikhemar et al. | |
| 8,830,881 | B2 | 9/2014 | Mikhemar et al. | |
| 8,854,155 | B2 | 10/2014 | Mikhemar et al. | |
| 2007/0207747 | A1 | 9/2007 | Johnson et al. | |
| 2013/0258911 | A1 | 10/2013 | Choksi | |
| 2014/0306780 | A1 | 10/2014 | Lehtinen | |

* cited by examiner

*Primary Examiner* — Tuan H Nguyen
(74) *Attorney, Agent, or Firm* — McDermott Will & Emery LLP

(57) ABSTRACT

A circuit for a low-loss duplexer with noise cancellation in a receive (RX) path of a transceiver includes a duplexer, a balancing network, and a noise cancellation circuit. The duplexer circuit is coupled to an antenna of the transceiver. The balancing network is coupled to the duplexer and provides an impedance matching an impedance associated with the antenna. The noise cancellation circuit senses a noise signal generated by the balancing network and uses the sensed noise signal to improve a signal-to-noise ratio (SNR) of the RX path.

20 Claims, 4 Drawing Sheets

US 9,712,258 B2

LOW-LOSS ELECTRICAL BALANCE DUPLEXER WITH NOISE CANCELLATION

CROSS-REFERENCE TO RELATED APPLICATIONS

This application claims the benefit of priority under 35 U.S.C. §120 from U.S. patent application Ser. No. 13/719,055 filed Dec. 18, 2012, which is incorporated herein by reference in its entirety.

TECHNICAL FIELD

The present description relates generally to radio frequency (RF) communications, and more particularly, but not exclusively, to a low-loss transmit (TX)-to-receive (RX) isolation using electrical balance duplexer with noise cancellation.

BACKGROUND

Many commercial cellular handsets require multi-band operation. Typically, a 2G/3G cellular transceiver may cover a number of 2G frequency bands (e.g., 850, 900, 1800, and 1900 MHz) and several 3G frequency bands (e.g., bands I, II, III). The existing multi-band approach may be inefficient in terms of cost and area. The limitation of such multi-band approach may stem from the need for highly selective radio-frequency (RF) filters, such as SAW filters for 2G and duplexers for 3G operation. With the introduction of new technologies such as 4G and multiple antennas, and the demand to cover more frequency bands, the number of required RF filters and duplexers may increase to an impractical level, in terms of cost and area.

An optimal implementation of a multi-band transceiver may include an antenna-ready radio, completely integrated on a single CMOS chip. One of the missing pieces to realize the single CMOS chip antenna-ready radio is a wideband multi-band RF duplexer, for example, a wideband integrated RF duplexer supporting 3G/4G (e.g., supporting bands, such as bands I, II, III, IV, and IX). The RF duplexer may provide isolation in transmit (TX) band to avoid saturation of the receiver, and also to relax the linearity and phase noise requirement of the receive (RX) path. For CMOS implementation, a proper choice for duplexer of an RF transceiver may include an electrical balanced duplexer (EBD) with a passive balancing network. The resistor elements of the passive balancing network may generate noise that may couple to the receive (RX) path of transceiver, thereby contributing to the noise figure (NF) of the RX path.

Therefore, the need exists for a low-loss RF duplexer that can substantially cancel the noise generated by the balancing network to improve the RX path signal-to noise ratio (SNR).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figures 1A, 1B:
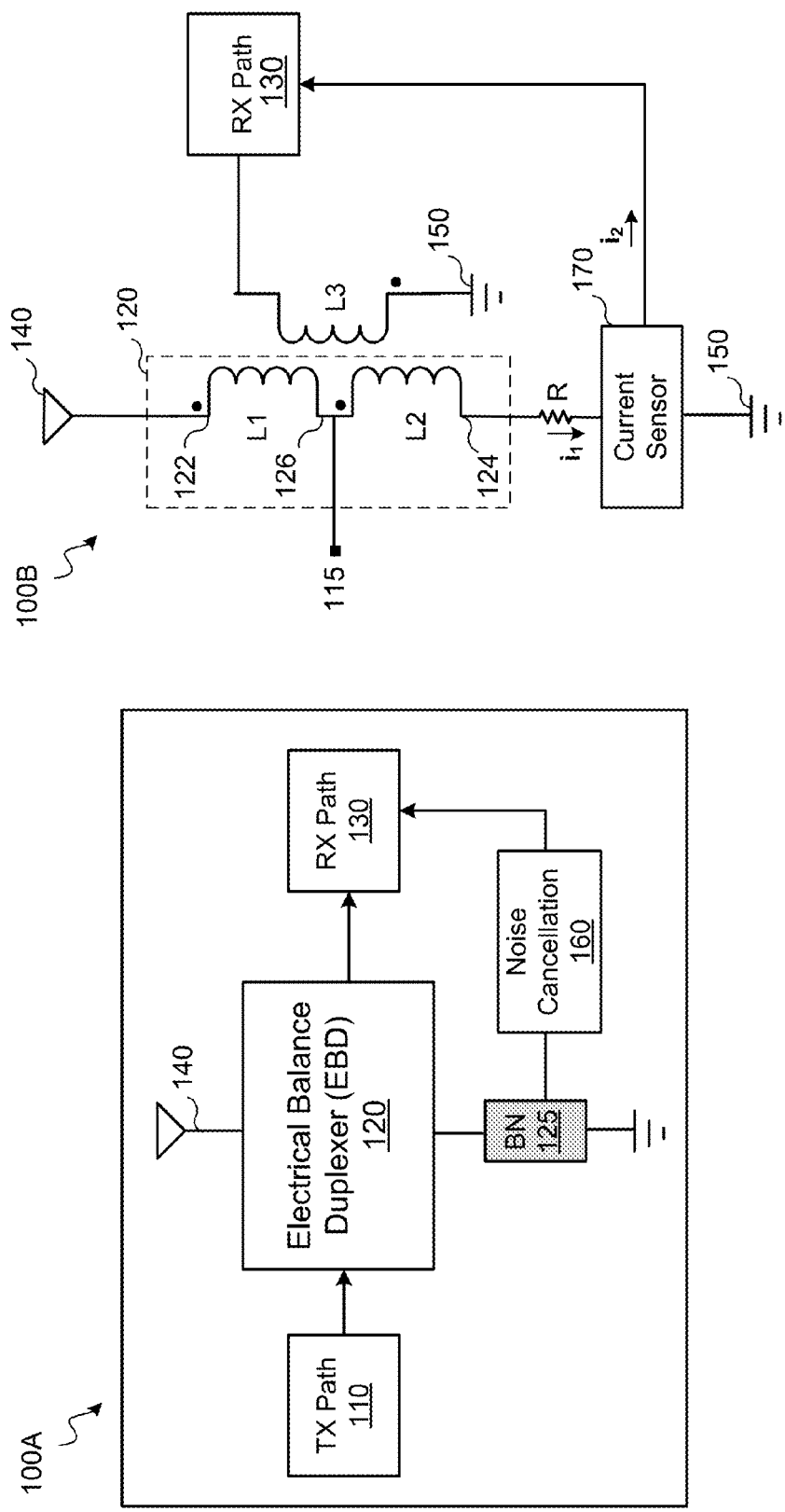
FIG. 1A illustrates an example RF transceiver using a low-loss electrical balance duplexer (EBD) with noise cancellation in accordance with one or more implementations.
FIG. 1B illustrates an example implementation of the low-loss EBD of the RF transceiver of FIG. 1A in accordance with one or more implementations.

FIG. 1A illustrates an example RF transceiver 100A using a low-loss electrical balance duplexer (EBD) with noise cancellation in accordance with one or more implementations of the present invention. The low-loss EBD of the RF transceiver 100A includes an EBD circuit 120, a balancing network (BN) 125, and may provide a low-loss isolation between a transmit (TX) path 110, coupled to a first port of the EBD circuit 120, and a receive (RX) path 130 coupled to a third port of the EBD circuit 120. A noise cancellation circuit 160 may cancel the noise generated by a balancing network 125. The noise cancellation circuit 160 may sense a noise signal generated by the balancing network 125 and utilize the sensed noise signal to improve a signal-to-noise ratio (SNR) of the RX path 130. A second port of the EBD circuit 120 may be coupled to an antenna 140 that can transmit/receive RF signals from/to the RF transceiver 100A. The EBD circuit 120 may be configured to isolate the TX path 110 from the RX path 130, and to provide a low-loss path between one or more output nodes of the transmit (TX) path and the antenna 140. The balancing network 125 may be configured to provide an impedance that matches an impedance associated with the antenna 140.

In RF transceivers, the role of the duplexer is to provide a specific isolation (e.g., 50 dB for 3G applications) in TX band to avoid saturation of the receiver or damaging the LNA, and also to relax the linearity and phase noise requirement of the RX path. Furthermore, the RF duplexer may attenuate the noise in the RX band by approximately 45 dB to push the RX-band noise below the RX noise floor. The conventional duplexers are implemented as two very sharp RF SAW filters. Typical insertion loss of the RF SAW duplexers, for the TX and RX path, may be approximately 2 dB and 2.5 dB, respectively. The SAW filters, however, cannot be integrated on a silicon-based chip. Further, a SAW filter typically has a narrow bandwidth, as a result, a conventional duplexer operating in multiple frequency bands may require multiple SAW filters (e.g., one for each frequency band), increasing the size and the cost of the RF board. The low loss EBD of the subject technology provides a low cost small area solution by facilitating integration of the TX and RX paths of the RF transceiver 100A on a single chip (e.g., CMOS chip). The low loss EBD of the present invention further allows cancellation of the noise of the balancing network.

FIG. 1B illustrates an example implementation 100B of the EBD circuit 120 of the RF transceiver 100A of FIG. 1A in accordance with one or more implementations of the present invention. The EBD circuit 120 may be implemented with an auto-transformer, formed by the inductors L1 and L2, and coupled, at node 122 of the auto-transformer (e.g., the second port of the EBD circuit 120) to the antenna 140. The middle node 126 of the autotransformer (e.g., the first port of the EBD circuit 120) may be connected to an output node 115 of the TX path 110 of FIG. 1A. The balancing network 125 of FIG. 1A may be a passive circuit including one or more passive elements (e.g., resistors and capacitors) and switches (e.g., CMOS switches). In one or more aspects of the present invention, the balancing network 125 may include a resistor R (e.g., having a resistance of R), which may be coupled between node 124 of the auto-transformer and a current sensor 170. The current sensor 170 may be an example implementation of the noise cancellation circuit 160 of FIG. 1A. The current sensor 170 may be configured to sense a first signal (e.g., a first current $i_1$) associated with the balancing network (e.g., resistor R), and generate a second signal (e.g., a second current $i_2$) related to (e.g., proportional to) the first signal. The current sensor 170 may feed the second signal back to the RX path 130 to cancel out an effect of the balancing network noise on the RX path 130.

In one or more aspects of the present invention, the noise cancellation circuit 160 (e.g., the current sensor 170) may reduce a loss associated with the balancing network (e.g., resistor R). The autotransformer may be skewed to favor the TX path 110 with lower insertion loss (IL) at the expense of higher noise figure (NF) for the RX path 130. Noise cancellation can then be used to reduce the NF, thus resulting in an overall lower loss for the TX path 110 and a better NF for RX path 130. In an aspect of the present invention, coupling of the third port of the EBD circuit 120 to an input node of the RX path 130 may be implemented by a transformer action of an inductor L3 that can be magnetically coupled to the inductors L1 and L2 of the autotransformer. The inductor L3 may be connected between the input node of the RX path 130 and ground potential 150.

Figures 2A, 2B:
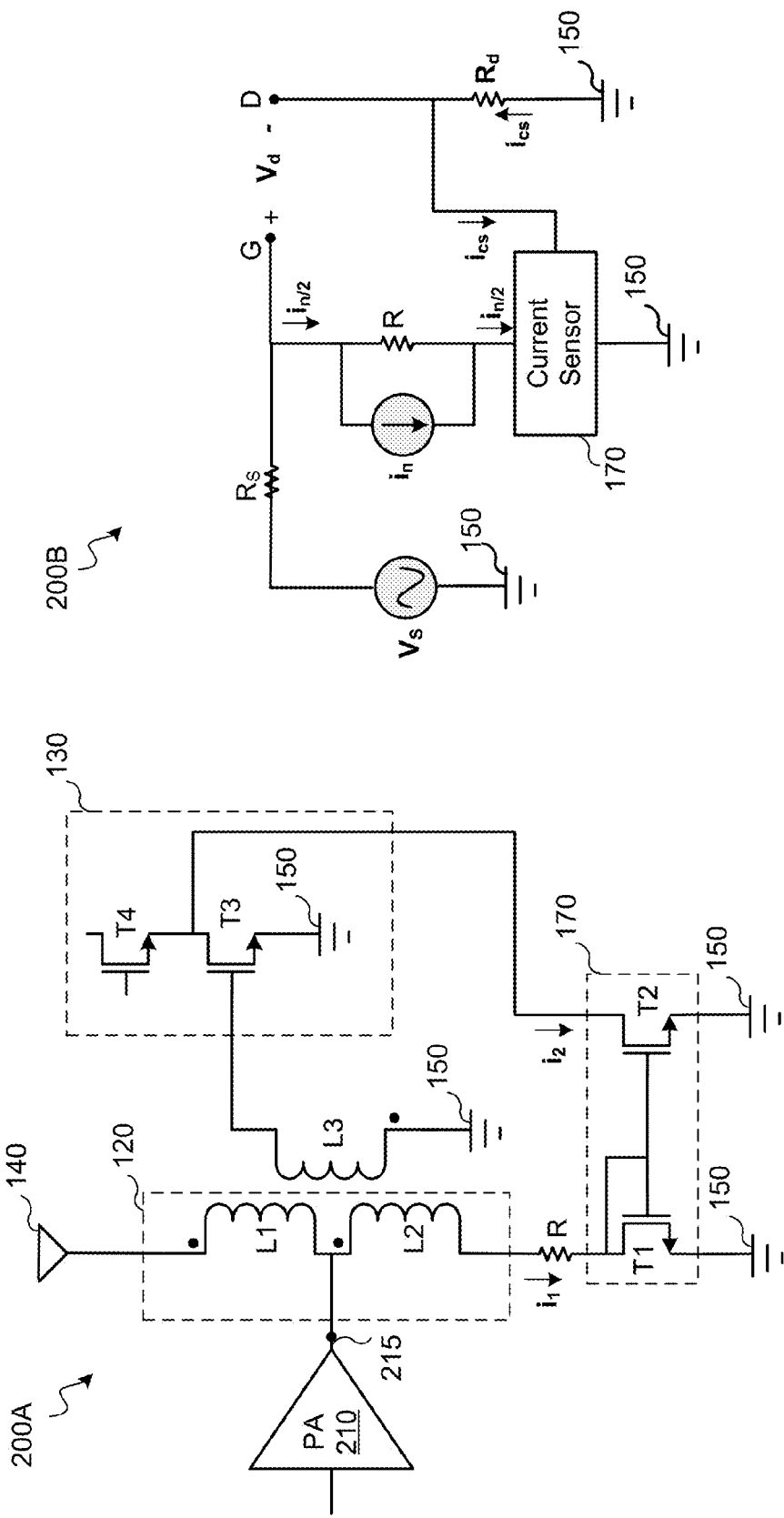
FIG. 2A illustrates an example implementation of the low-loss EBD with noise cancellation in accordance with one or more implementations.
FIG. 2B illustrates an example equivalent circuit of the implementation of FIG. 2A in accordance with one or more implementations.

FIG. 2A illustrates an example implementation 200A of the low-loss EBD with noise cancellation in accordance with one or more implementations of the present invention. The EBD circuit 120 of the implementation 200A is similar to the EBD circuit 120 of FIG. 1B, and the balancing network 125 of FIG. 1A is implemented by the resistor R. A power amplifier (PA) 210 of the TX path 110 of FIG. 1A is connected to the node 215 of the EBD circuit 120. A current signal $i_t$ passing through resistor R is sensed by the current sensor 170, which may be implemented by a current mirror formed by transistors (e.g., NMOS transistors) T1 and T2, the source nodes of which are connected to ground potential 150. It is understood that in the current mirror, the drain signal current $i_2$ of the transistor T2 is proportional to the current signal $i_1$ of the resistor R. The constant of proportionality K may be approximated by the ratio of transconductance parameter ($g_m$) of the transistors T1 and T2: $K=i_2/i_1 \approx g_{m2}/g_{m1}$, wherein $g_{m1}$ and $g_{m2}$ are the transconductance parameters of the transistors T1 and T2, respectively. The signal current $i_2$ may be fed to the drain of transistor T3 of the RX path 130, where, as shown below, may cancel the effect of noise from the resistor R in an output voltage of the RX path 130. For the RX path 130, for simplicity, only two transistors T3 and T4 are shown. The actual circuit for RX path 130, however, may be more complex than the circuit shown here. The coupling of the input node of the RX path 130 (e.g., gate of T3) to the EBD circuit 120 may be provided by the transformer action of the inductor L3, which is magnetically coupled to the inductors L1 and L2 of the auto-transformer of the EBD circuit 120.

FIG. 2B illustrates an example equivalent circuit 200B of the implementation 200A of FIG. 2A in accordance with one or more implementations of the present invention. In the equivalent circuit 200B, an output stage of the power amplifier (PA) 210 (e.g., the output stage of the TX path 110 of FIG. 1A) may be modeled by a resistor $R_s$ (e.g., having a reissuance of $R_s$) in series connection with a voltage signal source $V_s$ (e.g., generating a voltage $V_s$). The noise (e.g., thermal noise) contribution of the resistor R (which may represent the balancing network 125 of FIG. 1A) may be denoted by the noise current source $i_n$ in parallel with the resistor R (e.g., a Norton equivalent circuit), where it can be shown that the signal current entering the Norton equivalent circuit is equal to $i_n/2$. The current signal $i_{cs}$ (e.g., $i_2$ of FIG. 2A) of the current sensor may be related to (e.g., proportional to) the current signal $i_n/2$, entering the current source 170.

From signal point of view, the induced voltage at the gate of the transistor T3 of FIG. 2A (e.g., node G) may be written as:

$$V_G=(V_s-i_n R_s)/2 \quad (1)$$

and the voltage at the drain node D of the transistor T3 (e.g., between node D and ground potential 150) may be given by:

$$V_D=-i_{cs}R_d, \quad (2)$$

where Rd is the resistance seen from the drain node D of the transistor T3. Using equations (1) and (2), the voltage $V_d$ between nodes G and D can be expressed as:

$$V_d=V_G-V_D=V_s/2-(R_s i_n/2-R_d i_{cs}) \quad (3)$$

Therefore, a condition for making the voltage $V_d$ independent of noise current $i_n$ may be derived from equation (3), as follows:

$$i_{cs}=(R_s/R_d)i_n/2=K\ i_n/2 \quad (4)$$

which may suggest a proportionality constant $K=R_s/R_d$ for the current sensor 170, where Rs and $R_d$ can be known values, once the topology of the TX and RX paths are known. Thus, with $K=R_s/R_d$, the noise due to the balancing network at the RX path can be canceled, which results in improving the signal-to-noise ratio (SNR) of the RX path.

Figure 3:
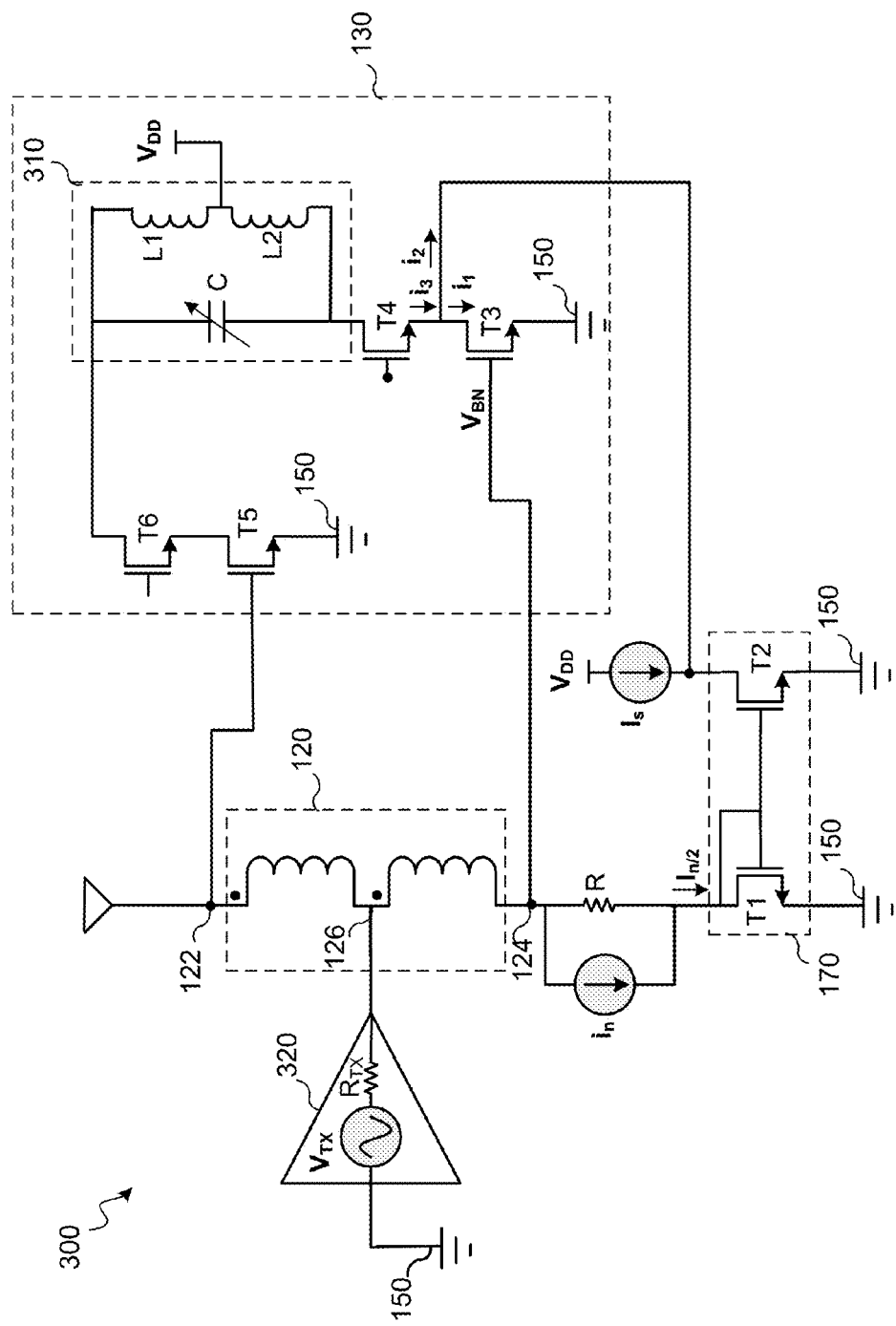
FIG. 3 illustrates another example implementation of the low-loss EBD with noise cancellation in accordance with one or more implementations.

FIG. 3 illustrates another example implementation 300 of the low-loss EBD with noise cancellation in accordance with one or more implementations of the present invention. In the implementation 300, an output stage of the PA 320, coupled to node 126 of the EBD circuit 120, may be modeled as a voltage source $V_{TX}$ (e.g., having a voltage of $V_{TX}$) in series with a resistor $R_{TX}$ (e.g., having a resistance of $R_{TX}$) connected between an output node of the PA 320 and ground potential 150. The EBD circuit 120 is similar to EBD circuit 120 of FIG. 1B, and the noise due to the resistor R (which is an example of the balancing network 125 of FIG. 1A) may be represented by the noise current source $i_n$ connected in parallel with the resistor R. The current sensor 170 may be implemented by the current mirror formed by transistors (e.g., NMOS transistors) T1 and T2, the source node of which are connected to ground potential 150. A current source $I_s$ provides bias current for the transistor T2. The RX path includes two cascodes (e.g., of a differential input LNA), a first cascode formed by transistors T3 and T4, and a second cascode formed by transistors T5 and T6. The two cascodes are coupled to the supply voltage $V_{DD}$ through a tuned circuit 310 formed by a variable capacitor C and inductors L1 and L2. The gates of the input transistors T3 and T5 are, respectively, coupled to nodes 124 and 122 of the EBD circuit 120. A sample current $i_2$ from the current sensor 170 is fed to a drain node of the transistor T3 (which is directly coupled to a source node of the transistor T4).

As shown herein, the noise of the balancing network (e.g., Resistor R) may be canceled at the TX path, such that a current $i_3$ of the transistor $T_4$ becomes independent of the noise current signal $i_n$ of the resistor R. The current $i_3$ can be expressed as the following:

$$i_3 = i_1 + i_2 \tag{5}$$

$$i_1 = g_{m3}V_{gs3} = g_{m3}V_{BN} \tag{6}$$

$$i_1 = = g_{m3}(V_{TX}/2 - R_{TX}i_n/2) \tag{7}$$

where, $g_{m3}$ is the transconductance of the transistor T3 and $V_{BN}$ is the voltage at node 124 of the EBD circuit 120. The current signal $i_2$ may be written as:

$$i_2 = K(V_{TX}/2R_{TX} + i_n/2) \tag{8}$$

Combining equations (5), (7), and (8) and assuming $R_{TX} = R$ gives:

$$i_3 = V_{TX}(g_{m3}/2 + K/2R) + i_n(K/2 - g_{m3}R/2) \tag{9}$$

From equation (9), one can see that with the condition: $K = g_{m3}R$, the value of the current signal $i_3$ can become independent of the noise current $i_n$ of the balancing network. In other words, using a value $K = g_{m3}R$ for the proportionality constant of the current mirror, the noise of the balancing network may be canceled from the TX path, therefore, improving the SNR of the TX path.

Figure 4:
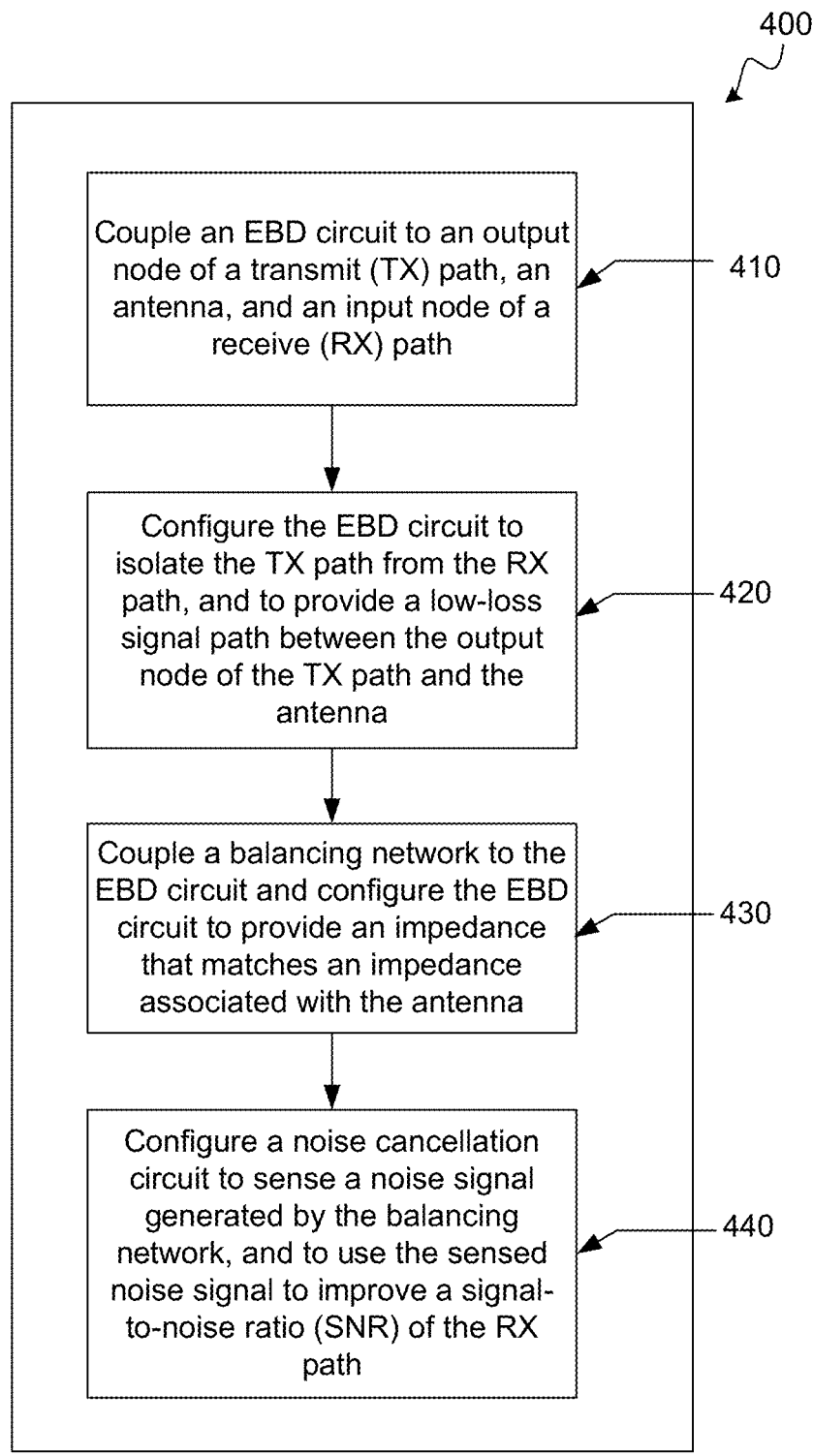
FIG. 4 illustrates an example method for providing a low-loss EBD with noise cancellation in accordance with one or more implementations.

FIG. 4 illustrates an example method 400 for providing a low-loss EBD with noise cancellation in accordance with one or more implementations of the present invention. For explanatory purposes, the example method 400 is described herein with reference to the RF transceiver 100A of FIG. 1A and EBD 120 of FIGS. 1B, 2A, and 3; however, the example method 400 is not limited to the RF transceiver 100A and EBD 120. Further, for explanatory purposes, the blocks of the example method 400 are described herein as occurring in serial, or linearly. However, multiple blocks of the example method 400 may occur in parallel. In addition, the blocks of the example method 400 need not be performed in the order shown and/or one or more of the blocks of the example method 400 need not be performed.

At operation block 410, an EBD circuit (e.g., 120 of FIGS. 1A, 1B, 2A, and 3) may be coupled to one or more output nodes of a TX path (e.g., 110 of FIG. 1A), an antenna (e.g., 140 of FIGS. 1A and 1B), and one or more input nodes of an RX path (e.g., 130 of FIGS. 1A, 1B, 2A, and 3). The EBD circuit, at operation block 420, may provide low-loss signal paths between the one or more output nodes (e.g., 126 of FIG. 3) of the TX path and the antenna.

At operation block 430, a balancing network (e.g., 126 of FIG. 1A and resistor R of FIGS. 1B, 2A, and 3) may be coupled to the EBD circuit. The balancing network may be configured to provide an impedance that matches a corresponding impedance associated with the antenna.

At operation block 440, a noise cancellation circuit (e.g., 160 of FIG. 1A and 170 of FIGS. 1B, 2A, and 3) may be configured to sense a noise signal (e.g., $i_n$ of FIGS. 2B and 3) generated by the balancing network, and to use the sensed noise signal to improve a signal-to-noise ratio (SNR) of the RX path.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A circuit for a low-loss duplexer with noise cancellation in a receive (RX) path of a transceiver, the circuit comprising:
   a duplexer circuit coupled to an antenna of the transceiver;
   a balancing network coupled to the duplexer and configured to provide an impedance matching an impedance associated with the antenna; and
   a noise cancellation circuit configured to sense a noise signal generated by the balancing network, and to use the sensed noise signal to improve a signal-to-noise ratio (SNR) of the RX path.

2. The circuit of claim 1, wherein the noise cancellation circuit is configured to:
   sense a first signal associated with the balancing network,
   generate a second signal related to the first signal, and
   feed the second signal to the RX path.

3. The circuit of claim 2, wherein the first signal comprises a first current signal passing through the balancing network, and wherein the second signal comprises a second current signal proportional to the first current signal.

4. The circuit of claim 3, wherein the noise cancellation circuit is configured to feed the second current signal to a low noise amplifier (LNA) of the RX path.

5. The circuit of claim 4, wherein:
   the balancing network comprises a resistor,
   the first current signal comprises a noise signal generated by the resistor, and
   the second current signal is coupled to an output node of a first transistor of the LNA.

6. The circuit of claim 3, wherein the noise cancellation circuit is further configured to reduce a loss associated with the balancing network.

7. The circuit of claim 1, wherein:
   the duplexer circuit comprises an electrical balance duplexer (EBD) circuit coupled to one or more output nodes of a transmit (TX) path, the antenna, and one or more input nodes of the RX path,
   the EBD circuit is configured to isolate the TX path from the RX path, and to provide low-loss signal paths between the one or more output nodes of the TX path and the antenna,
   the EBD circuit comprises an auto-transformer, and
   the auto-transformer comprises a first and a second node and a middle node.

8. The circuit of claim 7, wherein:
   the antenna and the balancing network are, respectively, coupled to the first and the second nodes of the auto-transformer,
   the middle node of the auto-transformer is coupled to an output node of the TX path,
   the one or more output nodes of the TX path include an output node of a power amplifier and,
   the EBD circuit further comprises a transformer configured to couple the EBD circuit to the one or more input nodes of the RX path.

9. The circuit of claim 7, wherein the first and the second nodes of the auto-transformer are coupled to the RX path, and wherein the RX path includes a tuned circuit.

10. A method for providing a low-loss duplexer with noise cancellation, the method comprising:
    coupling a duplexer circuit to an antenna of a transceiver;
    coupling a balancing network to the duplexer circuit;
    configuring the balancing network to provide an impedance matching an impedance associated with the antenna; and
    configuring a noise cancellation circuit to sense a noise signal generated by the balancing network and to use the sensed noise signal to improve a signal-to-noise ratio (SNR) of a receive (RX) path.

11. The method of claim 10, wherein configuring the noise cancellation circuit comprises configuring the noise cancellation circuit to:
    sense a first signal associated with the balancing network,
    generate a second signal related to the first signal, and
    feed the second signal to the (RX) path.

12. The method of claim 11, wherein the first signal comprises a first current signal passing through the balancing network, and wherein the second signal comprises a second current signal that is proportional to the first current signal.

13. The method of claim 12, further comprising configuring the noise cancellation circuit to feed the second current signal to a low noise amplifier (LNA) of the RX path.

14. The method of claim 13, wherein:
    coupling the duplexer circuit comprises coupling an electrical balance duplexer (EBD) circuit,
    coupling the balancing network to the duplexer circuit comprises coupling a resistor to the EBD circuit,
    the first current signal comprises a noise signal generated by the resistor, and
    the method further comprises coupling the second current signal to an output node of a first transistor of the LNA.

15. The method of claim 12, further comprising configuring the noise cancellation circuit to reduce a loss associated with the balancing network.

16. The method of claim 10, wherein coupling the duplexer circuit comprises coupling an auto-transformer, and wherein the auto-transformer comprises a first and a second node and a middle node.

17. The method of claim 16, further comprising:
    coupling the antenna and the balancing network, respectively, to the first and the second nodes of the auto-transformer, and
    coupling the middle node of the auto-transformer to an output node of a transmit (TX) path, and
    coupling a transformer to one or more input nodes of the RX path, wherein the output node of the TX path include an output node of a power amplifier.

18. The method of claim 16, further comprising coupling the first and the second nodes of the auto-transformer to the RX path, and wherein the RX path includes a tuned circuit.

19. An RF transceiver comprising:
an antenna configured to transmit and receive RF signals, and
a low-loss duplexer with noise cancellation comprising:
a duplexer circuit coupled to the antenna;
a balancing network coupled to the duplexer circuit and configured to provide an impedance matching an impedance associated with the antenna; and
a noise cancellation circuit configured to sense a noise signal generated by the balancing network, and to use the sensed noise signal to improve a signal-to-noise ratio (SNR) of a receive (RX) path.

20. The RF transceiver of claim 19, wherein the noise cancellation circuit is configured to:
sense a first signal associated with the balancing network;
generate a second signal related to the first signal; and
feed the second signal to the RX path,
wherein:
the first signal comprises a first current signal passing through the balancing network, the second signal comprises a second current signal that is proportional to the first current signal,
the noise cancellation circuit is configured to feed the second current signal to a low noise amplifier (LNA) of the RX path, and
the noise cancellation circuit is further configured to reduce a loss associated with the balancing network.

* * * * *